Dec. 5, 1933.  H. E. TAUTZ  1,938,549
MACHINE TABLE
Filed July 22, 1933 2 Sheets-Sheet 2
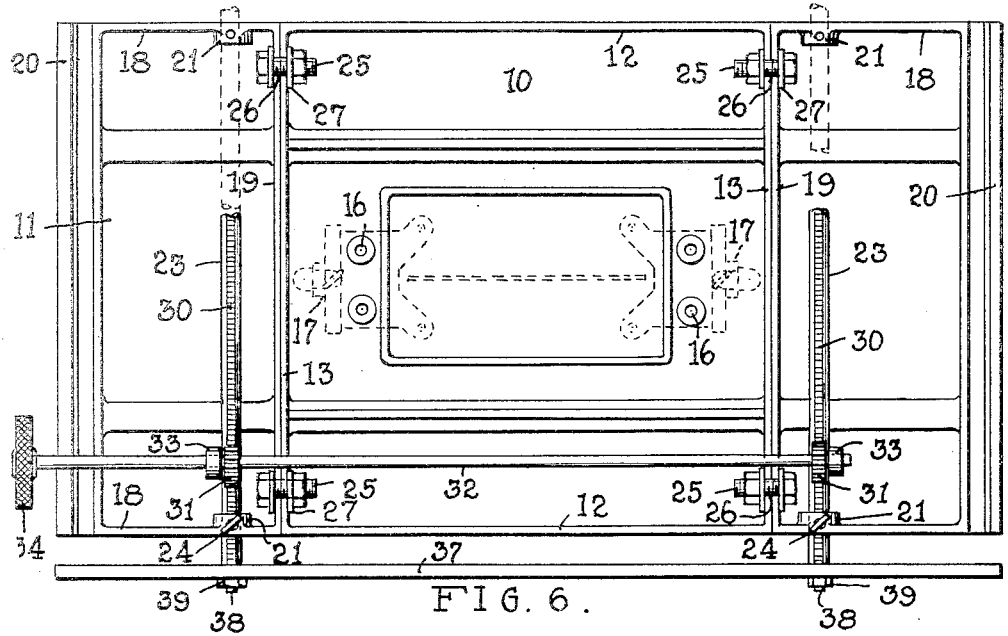
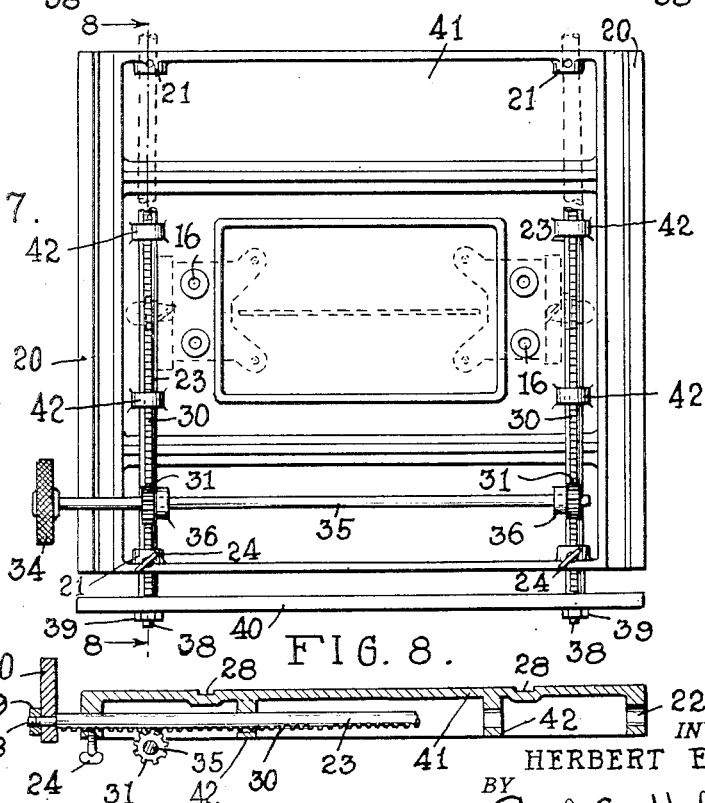
INVENTOR
HERBERT E. TAUTZ,
BY Carl A. Hellmann,
ATTORNEY Patented Dec. 5, 1933

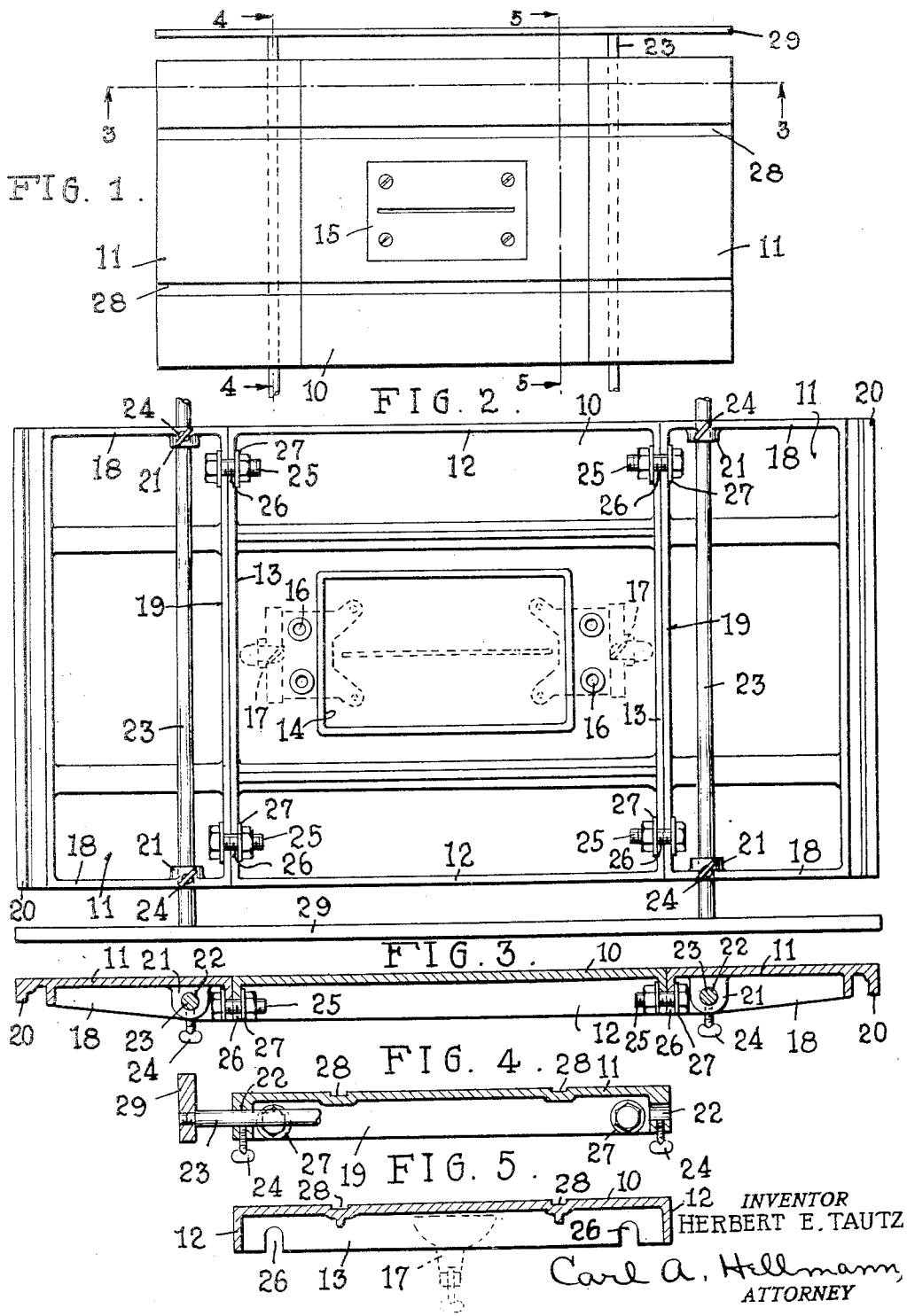

1,938,549

UNITED STATES PATENT OFFICE 1,938,549

MACHINE TABLE

Herbert E. Tautz, Milwaukee, Wis., assignor to Delta Manufacturing Company, Milwaukee, Wis.

Application July 22, 1933. Serial No. 681,768

17 Claims. (Cl. 143—174)

The invention relates to tables for wood-working machines.

The use of large tables on wood-working machines, such as circular saws, is recognized as desirable in order to insure accurate work. In the manufacture of wood-working machines for the so-called "home work shops", it has heretofore been proposed to provide enlarged tables by constructing them of larger castings, but these have been found to possess a number of disadvantages. Castings for small tables can be economically produced by the so-called "squeezer" method of machine molding, which provides smooth and light castings having little warping and small internal strains and capable of easy machining. Castings for larger tables, however, are subject to much greater warping and internal strains and consequently require thicker cross-sections and more expensive machining. Other disadvantages of larger castings are unduly increased cost of manufacture, a rougher surface, and increased loss by scrapping.

In order to overcome these disadvantages, it is an object of the present invention to provide an enlarged sectional table which is so constructed as to permit easy machining and the use of light and smooth castings subject to little warping, to minimize internal strains in the table and thereby insure the maintenance of a flat table top surface, to decrease losses by scrapping incident to casting or machining defects and to reduce the cost of manufacture in order to render the table suitable for small size machines in home work shops.

A further object of my invention is to provide an extension gage adapted to cooperate with an enlarged sectional table of this type, or even with the main central section of such table alone, whereby material of considerably greater width may be ripped or otherwise machined by the saw or the like than would be possible with the ordinary rip gage of the conventional type, which is usually engaged at the front edge of the table and guided by said front edge. This extension gage is supported by a plurality of rods guided by the table or by the extensions of such table, and itself may be extended parallel to but beyond the adjacent side of said table and its extensions. This invention relates to a further development and improvement of certain features of the invention disclosed in my co-pending application Serial No. 655,279, for Machine table extensions, filed February 4, 1933.

A still further object is to provide means comprising at least one rack and a cooperating pinion mounted on a shaft extending to the front of the machine and having a conveniently located handle for manipulating such extension gage.

Other objects and advantages of the invention will be obvious from the following specification and the accompanying drawings wherein several embodiments of my invention are disclosed.

In said drawings:

Fig. 1 is a top plan view of a machine table embodying certain features of the invention, Fig. 2 is a bottom plan view thereof, Fig. 3 is a longitudinal sectional elevation of the table taken along the line 3—3 of Fig. 1, Fig. 4 is a transverse sectional elevation of the table taken along the line 4—4 of Fig. 1, Fig. 5 is a transverse sectional elevation of an intermediate part of the table taken along the line 5—5 of Fig. 1, Fig. 6 is a bottom plan view of a table, with its extensions, of the same general type as shown in Fig. 2, but having improved operating means for the extension gage, Fig. 7 is a bottom plan view of a smaller table, corresponding to the central portion of Figs. 2 and 6, but provided with improved operating means for the extension rip gage, and Fig. 8 is a sectional end elevation on the line 8—8 of Fig. 7.

Referring first to Figs. 1-5 of the drawings, the numeral 10 designates an intermediate main table section of rectangular shape which is secured to rectangular end table sections 11, as hereinafter described. The intermediate table section is formed of a ribbed casting which has a flat top surface and depending marginal flanges 12 and 13. In the case of a circular-saw table, a rectangular opening 14 is formed in the intermediate table section 10 to receive a slotted throat plate 15 of metal, wood, or other material, secured in place in any suitable manner, the top surface of the plate being flush wtih the top surface of the table section, with the rotating saw blade passing through the slot. Tapped bosses 16 may be formed on the lower surface of the table section 10 for the attachment of suitable trunnion brackets 17 by which the table may be tiltably mounted on a supporting frame. A construction for this purpose is exemplified in my United States Patent No. 1,697,669, issued January 1, 1929.

Each end table section 11 is formed of a ribbed casting having a flat top surface and having depending marginal flanges 18 and 19 and a depending marginal end tongue 20 for the attachment of a fence. The opposite flanges 18 are provided with bosses 21 having alined bores 22 formed therein for the reception of parallel rods 23, which with fence 29 form an extension rip gage, the rods being slidable in the bosses and releasably clamped in position by wing screws 24 threaded into the bosses.

The flanges 13 and 19 of the complementary table top sections are preferably provided with flat abutting surfaces perpendicular to the top surfaces and may be secured together by a coating of iron cement and by heavy nut-carrying bolts 25, which extend through downwardly opening notches 26 formed in the flanges, clamping washers 27 being fitted on the bolts to engage the inner faces of the flanges. The top surface of the table preferably is provided with parallel longitudinally extending grooves 28 for the reception of a miter gage, the table sections being suitably ribbed below and along these grooves.

In the fabrication of the table, the separate table sections are given a roughing cut on their flat top surfaces to relieve internal strains in the castings, and the outer faces of the flanges 13 and 19 are machined to present flat surfaces perpendicular to the top surfaces. The bores 22 are drilled in the end sections 11 by means of suitable jigs, the separate end sections being easily handled for this purpose. A coating of iron cement may then be applied to the outer machined faces of the flanges 13 and 19, and the table sections rested face downward on a flat levelling support. The flanges 13 and 19 are then brought into abutment and may be permanently clamped together by the bolts 25 which are dropped into the notches 26. The top surface of the assembled table is then given a light finishing cut to insure a perfectly flat surface. The end tongues 20 and grooves 28 are also machined after the table is assembled. In some instances, the table sections may be given a finishing cut on their top surfaces before they are assembled, these surfaces being registered by means of the flat levelling support on which the sections are later assembled.

Since the castings for the table sections are relatively small, they are subject to very little warping and small internal strains, thus minimizing the amount of stock required to be removed in the machining operations, reducing inequalities in the thickness of the top panels after machining, permitting the castings to be of light weight, and insuring the maintenance of a flat top surface on the assembled table and alinement of the gage-receiving grooves and fence-receiving ways. The small castings can be economically produced by machine molding and are readily cast with a smooth surface, thus presenting a good appearance without requiring additional bench or machine finishing. If any of the top sections become damaged in casting or machining, the loss by scrapping is minimized. In the event that, after the top sections are assembled, hidden casting defects, such as cavities, are found, or damage is done in machining, the defective top section can be removed and replaced after loosening the clamping bolts, thereby avoiding the necessity for scrapping the entire table. The clamping bolts, however, may remain permanently attached after the table goes into use.

Referring now to Fig. 6 it will be noted that this figure shows a structure identical in all respects with that shown in Fig. 2 with the exception that improved means are provided for manipulating the rip gage. These improved means comprise a rod or shaft 32 mounted in bearings 33, secured to or integral with the sections 11 secured to the ends of the central section 10 of the table, said rod 32 being provided with a convenient operating handle or wheel 34 extending beyond the front end of the forward section 11, and carrying pinions 31 cooperating respectively with rack teeth 30, provided on the rods 23, which pass through the bosses 21. The fence 37 forming part of the extension rip gage may be removably secured to the rods 23 in any suitable way, for example, by providing each rod 23 with a reduced threaded end 38 passing through the said fence 37, as shown, nuts 39 cooperating with said threaded ends 38 to hold the fence 37 to the said rods.

The structure illustrated in Figs. 7 and 8 is practically identical with that illustrated in Fig. 6 with the exception that in the form illustrated in Figs. 7 and 8 the extension gage 40 is applied to a table 41 made of a single piece of material, which is substantially the same as the central section 10, shown in Fig. 1. Here the rip gage comprises a fence 40 secured to the rods 23, each of which has rack teeth 30 cut therein cooperating with pinions 31 secured to the shaft 35, which is mounted in suitable bearings 36, secured to or integral with the table 41 and said rod 35 is provided with a convenient operating means 34 as in the Figure 6 form. The fence 40 is preferably secured to the rods 23 by means of reduced threaded ends 38 and nuts 39 exactly as in the said Figure 6 form.

The operation of the rip gage disclosed in Figs. 1-5 is very simple and consists merely in sliding the fence 29 of the said gage toward or from the adjacent parallel side edge of the table by sliding the rods 23 through the bosses 21 to the proper locations and then tightening one or more of the thumb screws 24 to secure the said rip gage in its adjusted position. The rods 23 may, of course, be of any desired length, and may extend through the opposed pairs of bosses 21, inasmuch as said opposite bosses are alined with one another. It will thus be possible to adjust the fence 29 to any reasonable desired distance from the rotating saw or other tool located in the center section 10 of the table, to permit ripping or otherwise machining a piece of material to a width greater than the distance between the said saw and the side of the table. The fence 29 may be secured to the rods 23 in any desired manner, for example, by screw threads, riveting, welding, etc., and need not necessarily be removable therefrom because at times when it is undesirable to have the fence 29 projecting above the plane of the table top it is necessary merely to remove the rip gage bodily from the table and reinsert the rods 23 into the bosses after turning the fence upside down, in which case it will no longer project above the plane of the table top, as is evident from its shape.

The operation of the form of gage shown in Figs. 6–8 is self-evident. Here again the rods 23 may be of any desired length, and may extend through the opposing pairs of bosses, if desired, but instead of manipulating the gage by merely sliding it in and out, this function is now performed more readily by the shaft 32 or 35 with its pinions 31, in mesh with the rack teeth 30. This has the added advantage that both rods 23 are, of course, operated in strict unison by the two pinions 31 which are secured to the same shaft 32 or 35, in Figs. 6 and 7, respectively. In these forms the rods may, of course, be secured in their adjusted positions by means of the thumb screws 24 just as in the Fig. 2 form. However, because of the presence of the rack teeth on the bars, it will not be possible to reverse this gage as in the form of Fig. 2. Therefore, I have provided removable securing means for the fence 37 so that said fence may be removed bodily from the device by merely removing the nuts 39, whereupon said fence 37 either may be left off whenever its presence is undesirable, because it projects above the plane of the table top, or else it may be returned to the rods 23, but upside down, so that it will no longer project objectionably above the plane of the said table top and it may be secured against loss when not in use by means of the nuts 39 when in this inverted position. The same manipulation applies also, of course, to the form shown in Figs. 7 and 8.

In the form shown in Fig. 7 a number of additional bosses, 42, may be provided, alined with the bosses 21, so as to guide the rods 23. When such bosses 42 are provided, the rods need not be as long as when they are absent, and they will still provide accurate and secure guidance to the rods.

It is obvious that the extension gages described in the present case, in connection with the conventional rip gage, which is employed over the table top itself, make it possible to cover a greatly increased range of widths of material when ripping or otherwise machining the same. It is obvious also that while the extension gage is shown in each case at one side of the table it may equally well be removed from this side and inserted in the opposite side, without any alteration in the structure, whereby the extension feature becomes available at either side of the table.

Having described a preferred embodiment of the invention and various modifications thereof, it will be understood that many changes, additions, omissions, etc., can be made therein without departing from the inventive idea, and, therefore, it is not to be considered as limited to the specific embodiments illustrated, but only as specified in the following claims.

I claim:

1. In a machine tool, a table, a rotatable tool mounted thereon, an extension secured to each end of the table, each extension having a guideway therein, said guideways extending parallel to the axis of rotation of the tool, a work guide projecting above the plane of the table and supports for said work guide, guided in said guideways and maintaining the work-engaging surface of the work guide perpendicular to the said axis and beyond a side of the table.

2. A machine tool having a table for guiding the work and a mechanically driven rotary tool cooperating with the said table to operate upon the said work, means having guideways secured to said table, said guideways being parallel to the axis of the tool, movable supports guided in said guideways, a work guide projecting above the plane of the table and secured to said supports and having a work-guiding surface, said supports maintaining the said work-guiding surface perpendicular to the axis of the tool, and solely beyond a side of the table.

3. A machine tool having a table for guiding the work and a mechanically driven rotary tool cooperating with the said table to operate upon the said work, means having guideways secured to said table, said guideways being parallel to the axis of the tool, movable supports guided in said guideways, a work guide projecting above the plane of the table and secured to said supports and having a work-guiding surface, said supports maintaining the said work-guiding surface perpendicular to the axis of the tool, and solely beyond a side of the table, and means for securing the supports at their desired adjusted positions in the guideways, thereby firmly securing the work guide at two spaced points.

4. A circular saw having a table, a rip gage projecting above the plane of the table and separate supports for said rip gage secured to the table in front of and behind said saw respectively, both said supports extending beyond a side of the table and supporting the rip gage solely beyond said side.

5. A circular saw having a table, a rip gage projecting above the plane of the table and separate supports secured to said rip gage and secured to the table in front of and behind said saw respectively, both said supports extending beyond a side of the table and supporting the rip gage solely beyond said side.

6. In a power saw having a rotating blade and a table having a guideway therein within the limits thereof, a rip gage adjustable relative to said table and said blade, means in said guideway for adjustably positioning said gage relative to said guideway having means connectable to the table and an elongated portion projectable beyond an edge of the table parallel to said blade and carrying said gage on the projecting end of said portion and parallel to said blade, and cooperating means for supporting the opposite end of said gage when beyond the edge of the table.

7. In a power tool having an operating tool and a table, a gage on said table, gage positioning means adjustable relative to the table and having an elongated gage-supporting portion projectable at will beyond the edge of the table in certain positions of said gage and carrying said gage on the projecting end of said portion parallel to the plane of operation of said tool, and gage-supporting means projecting beyond the edge of the table cooperating with said adjustable means and supporting the free end of said gage when the latter is beyond the edge of the table.

8. In a machine tool, a table, a rotatable tool mounted thereon, an extension secured to each end of the table, each extension having a guideway therein, said guideways extending parallel to the axis of rotation of the tool, a work guide projecting above the plane of the table, supports for said work guide, guided in said guideways and maintaining the work-engaging surface of the work guide perpendicular to the said axis and beyond a side of the table, and means for moving said supports to adjust the said work guide.

9. A machine tool having a table for guiding the work and a mechanically driven rotary tool cooperating with the said table to operate upon the said work, means having guideways, secured to said table, said guideways being parallel to the axis of the tool, movable supports having rack teeth and guided in said guideways, pinions in mesh with said rack teeth, means for rotating said pinions, and a work guide projecting above the plane of the table and secured to said supports and having a work-guiding surface, said supports maintaining the said work-guiding surface perpendicular to the axis of the tool, and beyond a side of the table.

10. A machine tool having a table for guiding the work and a mechanically driven rotary tool cooperating with the said table to operate upon the said work, means having guideways secured to said table, said guideways being parallel to the axis of the tool, movable supports having rack teeth and guided in said guideways, a shaft, pinions on said shaft in mesh with said rack teeth, for adjusting said supports, a work guide projecting above the plane of the table and secured to said supports and having a work-guiding surface, said supports maintaining the said work-guiding surface perpendicular to the axis of the tool, and beyond a side of the table, and means for securing the supports at their desired adjusted positions in the guideways, thereby firmly securing the work guide at two spaced points.

11. A circular saw having a table, a rip gage projecting above the plane of the table, separate supports for said rip gage movably secured to the table in front of and behind said saw, respectively, both said supports extending beyond a side of the table and supporting the rip gage beyond said side, and means for moving said supports in unison, to adjust the rip gage.

12. A circular saw having a table, a rip gage projecting above the plane of the table, separate supports secured to said rip gage and adjustably secured to the table in front of and behind said saw, respectively, both said supports extending beyond a side of the table and supporting the rip gage beyond said side, each support having rack teeth thereon, pinions in mesh with said teeth, and a shaft carrying said pinions, whereby the supports may be adjusted by rotating the said shaft.

13. A machine table comprising a cast metal intermediate table section having a machined flat top surface and a cutter-receiving opening, and a pair of cast metal table sections rigidly and permanently secured to the opposite ends of said first-named table section and having machined flat top surfaces registering with the top surface of said intermediate top section to provide an extended flat work-supporting top area, said intermediate table section and end table sections being small relative to the top area of the assembled table, each of said end sections having transverse guideways, rods slidably arranged in said guideways, and a fence secured to the outer ends of said rods and projecting above the top of the table, and beyond but parallel to the adjacent side edge of the table.

14. A machine tool having a mechanically-driven tool and a table, a work-guiding gage projecting above the plane of the table and separate supports for the said gage secured to the table in front of and behind said mechanically-driven tool respectively, both said supports extending beyond a side of the table and supporting the gage solely beyond said side.

15. A machine tool having a mechanically-driven tool and a table, a work-guiding gage projecting above the plane of the table and separate supports secured to said gage and secured to the table in front of and behind said mechanically-driven tool respectively, both said supports extending beyond a side of the table and supporting the gage solely beyond said side.

16. A machine tool having a mechanically-driven tool and a table, a work-guiding gage projecting above the plane of the table, separate supports for said gage movably secured to the table in front of and behind said mechanically-driven tool respectively, both said supports extending beyond a side of the table and supporting the gage beyond said side and means for moving said supports in unison to adjust the gage.

17. A machine tool having a mechanically-driven tool and a table, a work-guiding gage projecting above the plane of the table, separate supports secured to said gage and adjustably secured to the table in front of and behind said mechanically-driven tool respectively, both said supports extending beyond a side of the table and supporting the gage beyond said side, each support having rack teeth therein, pinions in mesh with said teeth, and a shaft carrying said pinions whereby the supports may be adjusted by rotating the said shaft.

HERBERT E. TAUTZ.

DISCLAIMER 1,938,549.—*Herbert E. Tautz*, Milwaukee, Wis. MACHINE TABLE. Patent dated December 5, 1933. Disclaimer filed January 23, 1935, by the patentee, the assignee, *Delta Manufacturing Company*, consenting.

Hereby enters this disclaimer to claims 2, 3, 4, 5, 14, and 15 in said specification which are in the following words, to wit:

"2. A machine tool having a table for guiding the work and a mechanically driven rotary tool cooperating with the said table to operate upon the said work, means having guideways secured to said table, said guideways being parallel to the axis of the tool, movable supports guided in said guideways, a work guide projecting above the plane of the table and secured to said supports and having a work-guiding surface, said supports maintaining the said work-guiding surface perpendicular to the axis of the tool, and solely beyond a side of the table.

"3. A machine tool having a table for guiding the work and a mechanically driven rotary tool cooperating with the said table to operate upon the said work, means having guideways secured to said table, said guideways being parallel to the axis of the tool, movable supports guided in said guideways, a work guide projecting above the plane of the table and secured to said supports and having a work-guiding surface, said supports maintaining the said work-guiding surface perpendicular to the axis of the tool, and solely beyond a side of the table, and means for securing the supports at their desired adjusted positions in the guideways, thereby firmly securing the work guide at two spaced points.

"4. A circular saw having a table, a rip gage projecting above the plane of the table and separate supports for said rip gage secured to the table in front of and behind said saw respectively, both said supports extending beyond a side of the table and supporting the rip gage solely beyond said side.

"5. A circular saw having a table, a rip gage projecting above the plane of the table and separate supports secured to said rip gage and secured to the table in front of and behind said saw respectively, both said supports extending beyond a side of the table and supporting the rip gage solely beyond said side."

"14. A machine tool having a mechanically-driven tool and a table, a work-guiding gage projecting above the plane of the table and separate supports for the said gage secured to the table in front of and behind said mechanically-driven tool respectively, both said supports extending beyond a side of the table and supporting the gage solely beyond said side.

"15. A machine tool having a mechanically-driven tool and a table, a work-guiding gage projecting above the plane of the table and separate supports secured to said gage and secured to the table in front of and behind said mechanically-driven tool respectively, both said supports extending beyond a side of the table and supporting the gage solely beyond said side."

[*Official Gazette February 26, 1935.*]